(12) United States Patent
Lee et al.

(10) Patent No.: US 10,126,420 B2
(45) Date of Patent: Nov. 13, 2018

(54) VEHICLE TYPE RADAR DEVICE AND VEHICLE TYPE RADAR CONTROL METHOD

(71) Applicant: MANDO CORPORATION, Pyeongtaek-si, Gyeonggi-do (KR)

(72) Inventors: Jae Eun Lee, Seoul (KR); Hae Seung Lim, Yongin-si (KR); Seong Hee Jeong, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 247 days.

(21) Appl. No.: 14/661,523

(22) Filed: Mar. 18, 2015

(65) Prior Publication Data

US 2016/0274231 A1    Sep. 22, 2016

(30) Foreign Application Priority Data

Mar. 18, 2014    (KR) .......................... 10-2014-0031795

(51) Int. Cl.
*G01S 13/93*    (2006.01)
*G01S 13/48*    (2006.01)
(Continued)

(52) U.S. Cl.
CPC .............. *G01S 13/931* (2013.01); *G01S 3/16* (2013.01); *G01S 7/40* (2013.01); *G01S 13/48* (2013.01); *G01S 2007/4034* (2013.01)

(58) Field of Classification Search
CPC ............ G01S 13/931; G01S 3/16–3/44; G01S 2007/4034; G01S 7/40–7/4021; G01S 13/424–13/426; G01S 13/48
See application file for complete search history.

(56) References Cited

U.S. PATENT DOCUMENTS

| | | | |
|---|---|---|---|
| 2001/0014845 A1* | 8/2001 | Minowa ................. | A61B 3/032 701/84 |
| 2004/0052083 A1* | 3/2004 | Daicho .................. | B60Q 1/085 362/466 |

(Continued)

FOREIGN PATENT DOCUMENTS

| CN | 1427268 A | 7/2003 |
|---|---|---|
| CN | 203289427 U | 11/2013 |

OTHER PUBLICATIONS

Chinese Office Action for corresponding Chinese Patent Application No. 201510119280.2 dated Dec. 28, 2016.

*Primary Examiner* — Matthew M Barker
(74) *Attorney, Agent, or Firm* — Hauptman Ham, LLP

(57) ABSTRACT

Disclosed herein are an automotive radar apparatus and a method of controlling automotive radar, capable of recognizing a road gradient by easily adjusting a vertical scan angle based on intensities of radio waves received by radar of a vehicle traveling on a road to recognize a gradient of the road, and of preventing deterioration of detection performance by vertically adjusting a radio wave elevation angle of the radar so as to be suitable for the road gradient. The automotive radar apparatus includes an antenna unit transmitting radar signals or receiving reflected radar signals according to elevation angles of a transmission antenna or a receiving antenna, and a control unit searching a center angle based on received power according to the elevation angles to set a beam corresponding to the center angle as a center beam and setting ranges of interest on the basis of the center beam.

11 Claims, 6 Drawing Sheets

(51) Int. Cl.
*G01S 3/16* (2006.01)
*G01S 7/40* (2006.01)

(56) References Cited

U.S. PATENT DOCUMENTS

| | | | |
|---|---|---|---|
| 2004/0065814 A1* | 4/2004 | Miyazaki | G01S 7/4972 250/222.1 |
| 2004/0117090 A1* | 6/2004 | Samukawa | B60K 31/0008 701/45 |
| 2004/0145513 A1* | 7/2004 | Katayama | G01S 7/032 342/70 |
| 2004/0162654 A1* | 8/2004 | Lu | B60G 17/0162 701/38 |
| 2006/0158369 A1* | 7/2006 | Shinoda | G01S 7/2925 342/70 |
| 2007/0219720 A1* | 9/2007 | Trepagnier | B60W 30/00 701/300 |
| 2008/0086248 A1* | 4/2008 | Lu | G05D 1/0891 701/41 |
| 2008/0086251 A1* | 4/2008 | Lu | B60T 8/1755 701/70 |
| 2008/0088707 A1* | 4/2008 | Iwaki | G01S 13/931 348/208.1 |
| 2010/0182432 A1* | 7/2010 | Augst | B60R 1/00 348/148 |
| 2011/0006941 A1* | 1/2011 | Samukawa | G01S 13/345 342/70 |
| 2011/0276216 A1* | 11/2011 | Vaughan | B60W 10/06 701/31.4 |
| 2012/0062743 A1* | 3/2012 | Lynam | B60Q 9/005 348/148 |
| 2012/0081542 A1* | 4/2012 | Suk | G06K 9/00805 348/139 |
| 2013/0103238 A1* | 4/2013 | Yu | G06F 17/00 701/22 |
| 2014/0292559 A1* | 10/2014 | Asanuma | G01S 13/06 342/133 |
| 2015/0081189 A1* | 3/2015 | Fairgrieve | B60W 30/16 701/96 |
| 2016/0046287 A1* | 2/2016 | Owen | B60W 50/082 701/43 |
| 2016/0059852 A1* | 3/2016 | Yamakado | B60W 40/107 701/41 |

* cited by examiner

VEHICLE TYPE RADAR DEVICE AND VEHICLE TYPE RADAR CONTROL METHOD

BACKGROUND OF THE INVENTION

Field of the Invention

Exemplary embodiments of the present invention relate to an automotive radar apparatus and a method of controlling automotive radar, capable of vertically adjusting an elevation angle of radar when a vehicle travels on a road in order for the vehicle to adapt to environments according to a road gradient.

Description of the Related Art

Application techniques of automotive radar are applied to an active cruise control, an adaptive cruise control, an intelligent cruise control, or the like.

Detection performance of automotive radar significantly varies according to road environments. The detection performance is also influenced by a curved road or a road gradient as well as structures around a road. Most automotive radar is implemented to be horizontally aligned when mounted to vehicles in a production process thereof, but it is impossible to vertically align the automotive radar before radar is serviced in a service center or the like. In this case, since a preceding vehicle is not properly detected when the road slopes, there is a problem in that a vehicle collision accident or the like may be caused.

SUMMARY OF THE INVENTION

An object of the present invention is to provide an automotive radar apparatus and a method of controlling automotive radar, capable of recognizing a road gradient by easily adjusting a vertical scan angle based on intensities of radio waves received by radar of a vehicle traveling on a road to recognize a gradient of the road, and of preventing deterioration of detection performance by vertically adjusting a radio wave elevation angle of the radar so as to be suitable for the road gradient.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an automotive radar apparatus includes an antenna unit transmitting radar signals or receiving reflected radar signals according to elevation angles of a transmission antenna or a receiving antenna, and a control unit searching a center angle based on received power according to the elevation angles to set a beam corresponding to the center angle as a center beam and setting ranges of interest on the basis of the center beam.

The control unit may further include a signal intensity measurement part configured to measure the received power of the received reflected radar signals. Here, the control unit may receive the reflected radar signals according to the elevation angles of the receiving antenna and select a specific angle matched with a preset criteria based on the received power of the received reflected radar signals, so that the specific angle is set as the center angle.

The control unit may further include an elevation angle adjustment part configured to drive a motor and adjust each elevation angle of the transmission antenna or receiving antenna, so as to transmit a radar signal or receive a reflected radar signal for each angle.

The control unit may further include an elevation angle adjustment part configured to adjust each elevation angle in a digital beamforming logic so as to transmit a radar signal for each angle or receive a reflected radar signal for each angle.

The specific angle matched with the preset criteria may be an angle at which the received power of the associated reflected radar signal is equal to or more than a certain criteria and is the greatest, from among the elevation angles of the receiving antenna.

When the control unit sets a beam through the transmission antenna, the control unit may transmit the radar signals on a cycle of a high beam, a center beam, and a low beam and receive the reflected radar signals within one receiving antenna beam region.

When the control unit sets a beam through the receiving antenna, the control unit may transmit the radar signals as signals corresponding to one transmission antenna beam and receive the reflected radar signals on a cycle of a high beam, a center beam, and a low beam.

The control unit may set the ranges of interest of a high beam and a low beam on the basis of the center beam.

When the high beam has the highest received power, the control unit may set the high beam as a new center beam corresponding to the center angle, set the center beam as a new low beam, and add a beam directed upward by a certain angle on the basis of the new center beam to set the beam as a new high beam.

When the low beam has the highest received power, the control unit may set the low beam as a new center beam corresponding to the center angle, set the center beam as a new high beam, and add a beam directed downward by a certain angle on the basis of the new center beam to set the beam as a new low beam.

The control unit may change a monitoring cycle of each beam based on the received power thereof.

After the control unit sets an interest rate for each beam based on the received power thereof, the control unit may change the monitoring cycle based on the set interest rate and exclude the beam having the received power less than a threshold value from the ranges of interest.

The control unit may set a monitoring period of the beam having the highest interest rate to be smaller than a certain criteria and set a monitoring period of the beam having the decreased interest rate to be longer than the certain criteria.

In accordance with another aspect of the present invention, a method of controlling automotive radar includes searching a center angle based on received power according to elevation angles of an antenna, setting the ranges of interest on the basis of the searched center angle, and transmitting radar signals to the set ranges of interest or receiving reflected radar signals from the set ranges of interest.

The setting the ranges of interest may include setting a beam corresponding to the center angle as a center beam, and setting a high beam directed upward by a certain angle and a low beam directed downward by a certain angle on the basis of the center beam.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
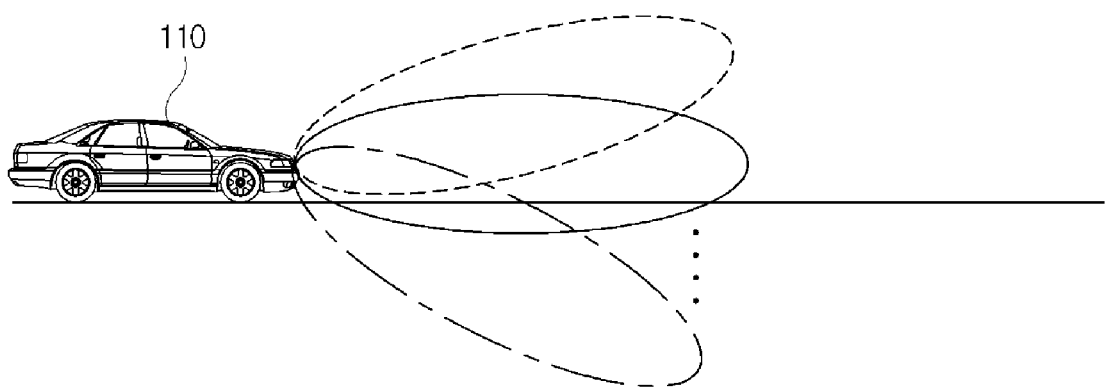
FIG. 1 is a view illustrating an example of beamforming of radar according to an embodiment of the present invention.

Exemplary embodiments of the present invention will be described below in more detail with reference to the accompanying drawings so as to be realized by a person of ordinary skill in the art. The present invention may, however, be embodied in different forms and should not be construed as limited to the embodiments set forth herein.

In certain embodiments, description irrelevant to the present invention may be omitted to avoid obscuring appreciation of the disclosure. Throughout the disclosure, like reference numerals refer to like parts throughout the various figures and embodiments of the present invention.

In the whole description, it will be understood that when an element is referred to as being "connected" to another element, it can be "directly connected" to the other element or it can be "electrically connected" to the other element with other elements being interposed therebetween. In addition, it will be understood that when a component is referred to as being "comprising" any component, it does not exclude other components, but can further comprises the other components unless otherwise specified.

It will be understood that when an element is referred to as being "above" another element, it can be immediately above the other element or intervening elements may also be present. In contrast, when an element is referred to as being "immediately above" another element, there are no intervening elements present.

Although terms such as first, second, and third are used to describe various parts, components, regions, layers, and/or sections, the present invention is not limited thereto. Such terms will be used only to differentiate one part, component, region, layer, or section from other parts, components, regions, layers, or sections. Accordingly, a first part, component, region, layer, or section may be referred to as a second part, component, region, layer, or section without deviating from the scope and spirit of the present invention.

The terminology used in the specification of the present invention is for the purpose of describing particular embodiments only and is not intended to limit the invention. As used in the specification and the appended claims, the singular forms are intended to include the plural forms as well, unless context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, and/or components thereof.

Spatially-relative terms such as "below", "above", or the like may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" other elements would then be oriented "above" the other elements. The exemplary terms "below" can, therefore, encompass both an orientation of above and below. Since the device may be oriented in another direction such as rotation of 90° or another angle, the spatially-relative terms may be interpreted in accordance with the orientation of the device.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present invention will be described in more detail with reference to the accompanying drawings so as to be realized by a person of ordinary skill in the art. The present invention may, however, be embodied in different forms and should not be construed as limited to the embodiments set forth herein.

FIG. 1 is a view illustrating an example of beamforming of radar according to an embodiment of the present invention.

As shown in FIG. 1, an automotive radar apparatus according an embodiment of the present invention may execute beamforming by means of a plurality of beams such as a high beam, a center beam, and a low beam for setting of the beamforming according to a vertical elevation angle of an antenna. That is, the beamforming is executed by one or more beams, such as a high beam, a center beam, and a low beam, having a regular angle difference on a regular cycle. Although exemplary embodiments of the present invention are described below on the basis of the high beam, the center beam, and the low beam for convenience' sake, the idea of the present invention may be applied to a case of using more various beams as well as the high beam, the center beam, and the low beam.

Figure 2:
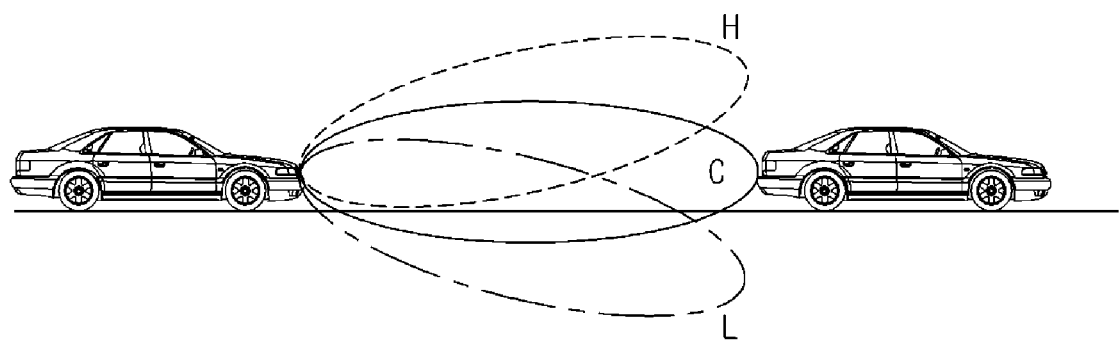
FIG. 2 is a view for explaining a method of controlling automotive radar on a flat road according to the embodiment of the present invention.

FIG. 2 is a view for explaining a method of controlling automotive radar on a flat road according to the embodiment of the present invention.

As shown in FIG. 2, when a vehicle 110 and a forward vehicle 120 travel on a flat road in a state in which a certain distance is maintained therebetween, radar signals are transmitted as signals corresponding to a high beam H, a center beam C, and a low beam L toward the forward vehicle 120 from the vehicle 110 every regular cycle, for example, every 50 ms.

The radar signal transmitted as a signal corresponding to the center beam C from the vehicle 110 is reflected by the forward vehicle 120 and is then returned to the vehicle 110 as a reflected radar signal. The respective radar signals transmitted as signals corresponding to the high beam H and the low beam L are reflected by an object such as a road surface or a road sign other than the forward vehicle 120 and are then returned as reflected radar signals.

The vehicle 110 receives the individual reflected radar signals, each having received power, and compares radio wave intensities of the respective reflected radar signals based on the received power thereof.

As a result of comparing the radio wave intensities, the reflected radar signal according to the center beam C reflected by the forward vehicle 120 has the highest radio wave intensity from among the reflected radar signals according to the high beam H, the center beam C, and the low beam L.

Accordingly, the center beam C having the highest radio wave intensity is set as a beam corresponding to a center angle of the radar signal in the vehicle 110.

In the vehicle 110, the high beam H is set to be directed upward by a certain angle on the basis of the center beam C corresponding to the set center angle, and the low beam L is set to be directed downward by a certain angle on the basis of the center beam C. Subsequently, the vehicle 110 alternately transmits the radar signals corresponding to the high beam H, the center beam C, and the low beam L every regular cycle.

Figure 3:
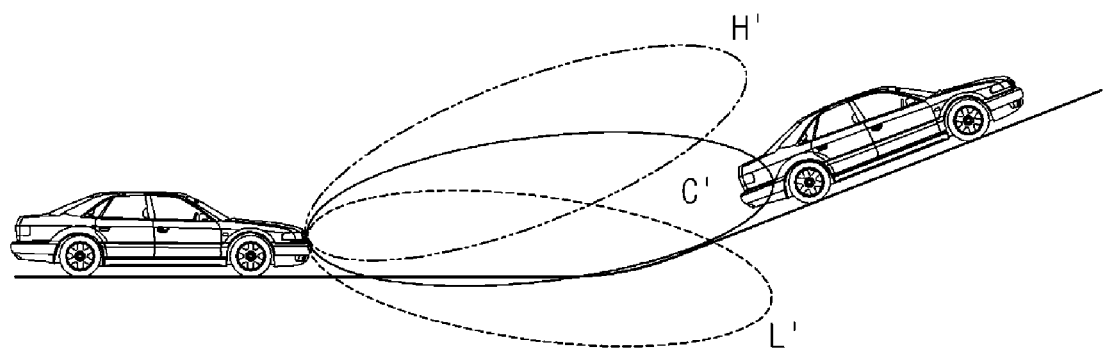
FIG. 3 is a view for explaining a method of controlling automotive radar on an uphill road according to the embodiment of the present invention.

FIG. 3 is a view for explaining a method of controlling automotive radar on an uphill road according to the embodiment of the present invention.

As shown in FIG. 3, when the vehicle 110 travels on the flat road and the forward vehicle 120 travels on the uphill road in a state of being spaced forward from the vehicle 110 by a certain distance, the radar signals are transmitted as signals corresponding to high beam H, the center beam C, and the low beam L toward the forward vehicle 120 from the vehicle 110 every regular cycle, as shown in FIG. 2.

The radar signals transmitted forward from the vehicle 110 as signals corresponding to the center beam C and the low beam L are reflected by the uphill road and are then returned to the vehicle 110. The radar signal transmitted as a signal corresponding to the high beam H is reflected by the forward vehicle 120 traveling on the uphill road and is then returned to the vehicle 110.

In the vehicle 110, radio wave intensities of the respective reflected radar signals are compared based on received power of the respective reflected radar signals.

As a result of comparing the radio wave intensities, the reflected radar signal according to the high beam H reflected by the forward vehicle 120 traveling on the uphill road has the highest radio wave intensity. Next, the reflected radar signal according to the center beam C reflected by the uphill road has the second-highest radio wave intensity, and the reflected radar signal according to the low beam L has the lowest radio wave intensity.

Accordingly, the high beam H having the highest radio wave intensity is set as a new center beam C' corresponding to a center angle in the vehicle 110.

Next, in the vehicle 110, a beam directed upward by a certain angle on the basis of the set new center beam C' is added and the beam is set as a new high beam H', and the existing center beam C directed downward by a certain angle on the basis of the new center beam C' is set as a new low beam L'.

In this case, in the vehicle 110, the existing low beam L having the lowest or slight radio wave intensity is removed.

Accordingly, the vehicle 110 alternately transmits the radar signals corresponding to the new high beam H', the new center beam C', and the new low beam L' every regular cycle, as shown in FIG. 3.

Figure 4:
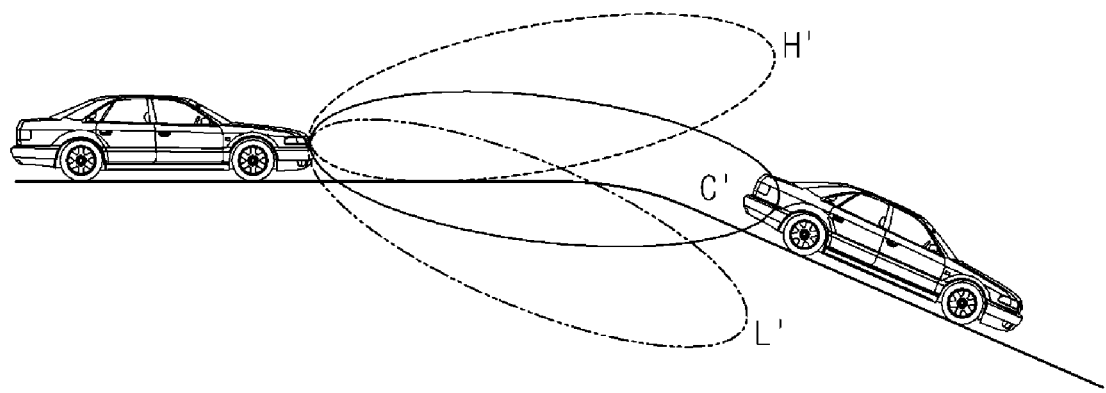
FIG. 4 is a view for explaining a method of controlling automotive radar on a downhill road according to the embodiment of the present invention.

FIG. 4 is a view for explaining a method of controlling automotive radar on a downhill road according to the embodiment of the present invention.

As shown in FIG. 4, when the vehicle 110 travels on the flat road and the forward vehicle 120 travels on the downhill road in a state of being spaced forward from the vehicle 110 by a certain distance, the radar signals are transmitted as signals corresponding to high beam H, the center beam C, and the low beam L toward the forward vehicle 120 from the vehicle 110 every regular cycle, as shown in FIG. 2.

The radar signals transmitted forward from the vehicle 110 as signals corresponding to the center beam C and the high beam H are reflected by an object other than the forward vehicle 120 and are then returned to the vehicle 110. The radar signal transmitted as a signal corresponding to the low beam L is reflected by the forward vehicle 120 traveling on the downhill road and is then returned to the vehicle 110.

In the vehicle 110, radio wave intensities of the respective reflected radar signals are compared based on received power of the respective reflected radar signals.

As a result of comparing the radio wave intensities, the reflected radar signal according to the low beam L reflected by the forward vehicle 120 traveling on the downhill road has the highest radio wave intensity. Next, the reflected radar signal according to the center beam C has the second-highest radio wave intensity, and the reflected radar signal according to the high beam H has the lowest radio wave intensity.

Accordingly, the low beam L having the highest radio wave intensity is set as a low beam corresponding to a center angle of the radar signal and the set low beam L is set as a new center beam C' corresponding to the center angle in the vehicle 110.

Next, in the vehicle 110, the center beam C having the second-highest radio wave intensity is set as a new high beam H', and a beam directed downward by a certain angle on the basis of the new center beam C' is added and set as a new low beam L'.

In this case, in the vehicle 110, the existing high beam H having the lowest or slight radio wave intensity is removed.

Accordingly, the vehicle 110 alternately transmits the radar signals corresponding to the new high beam H', the new center beam C', and the new low beam L' every regular cycle, as shown in FIG. 4.

Figure 5:
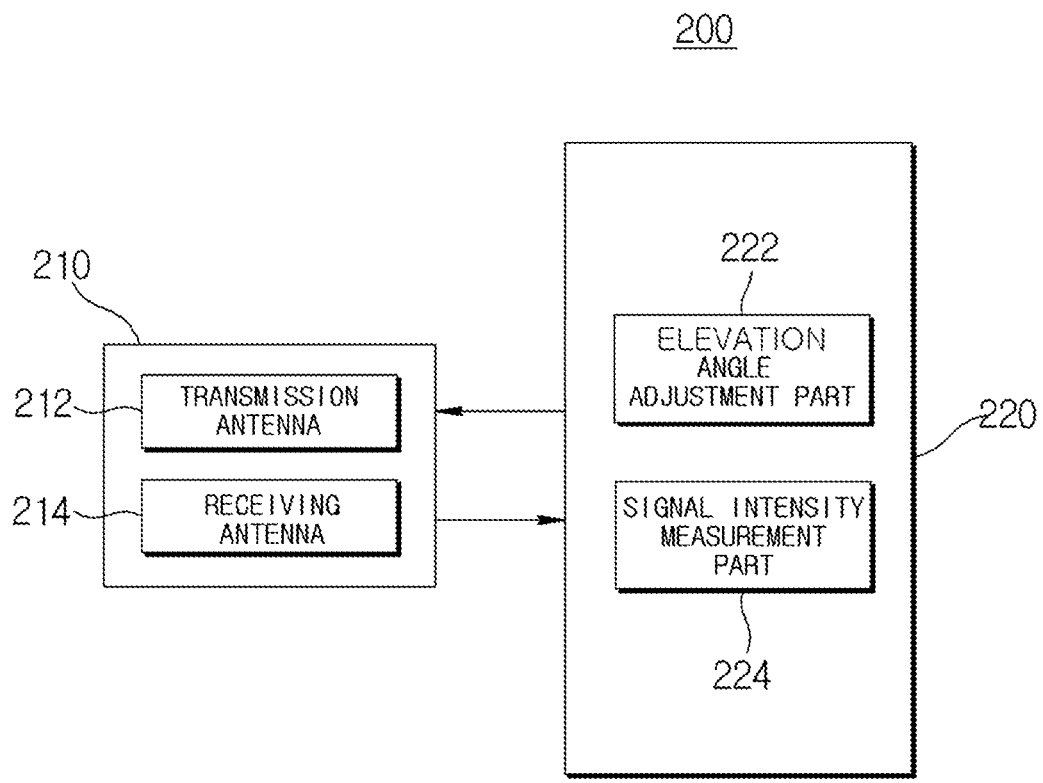
FIG. 5 is a diagram illustrating a configuration example of an automotive radar apparatus according to the embodiment of the present invention.

FIG. 5 is a diagram illustrating a configuration example of an automotive radar apparatus according to the embodiment of the present invention.

Referring to FIG. 5, an automotive radar apparatus 200 according to the embodiment of the present invention includes an antenna unit 210 and a control unit 220.

The antenna unit 210 includes a transmission (Tx) antenna 212 for transmitting a radar signal and a receiving (Rx) antenna 214 for receiving a reflected radar signal corresponding to the radar signal.

The antenna unit 210 transmits the radar signal or receives the reflected radar signal according to an elevation angle of the transmission antenna 212 or receiving antenna 214.

The control unit 220 searches a center angle based on received power according to the elevation angle of the antenna unit 210, sets a beam corresponding to the searched center angle as a center beam, and sets ranges of interest of a high beam and a low beam on the basis of the center beam.

Here, the reflected radar signal received according to the elevation angle of the receiving antenna 214 has received power indicative of a radio wave intensity.

In addition, the control unit 220 may include an elevation angle adjustment part 222 for adjusting the vertical elevation angle of the transmission antenna 212 or receiving antenna 214 and a signal intensity measurement part 224 for measuring the received power indicative of the radio wave intensity of the reflected radar signal.

The signal intensity measurement part 224 may also be incorporated with the antenna unit 210 and realized together with the same. In addition, the signal intensity measurement part 224 may be realized as a separate hardware or software which measures the intensity of the received signal to improve the speed thereof, for rapid adjustment when the vehicle travels.

The control unit 220 receives the reflected radar signals according to the elevation angles of the receiving antenna 214 and selects a specific angle which is matched with a preset criteria based on the received power of the received reflected radar signals, so that the specific angle is set as a center angle. The specific angle matched with the preset criteria may mean an angle at which the received power of each reflected radar signal is equal to or more than a certain criteria and is the greatest, from among the elevation angles of the receiving antenna 214.

The control unit 220 sets a beam corresponding to the center angle of the antenna unit 210 as a center beam C, and the elevation angle adjustment part 222 adjusts the vertical elevation angle on the basis of the center beam C and sets a high beam H directed upward by a certain angle and a low beam L directed downward by a certain angle.

In addition, the control unit 220 may drive a motor to transmit a radar signal or receive a reflected radar signal in a mechanical manner for each angle according to the elevation angles of the transmission antenna 212 or receiving antenna 214.

The control unit 220 may adjust the elevation angle in a digital beamforming logic to transmit a radar signal or receive a reflected radar signal for each angle.

In addition, the elevation angle adjustment part 222 may include a device for physically changing the vertical angle of the transmission antenna 212 or receiving antenna 214. For example, the elevation angle adjustment part 222 may include a device for driving a motor adjusting an elevation direction of the transmission antenna 212 or receiving antenna 214 itself.

In this case, when the transmission antenna 212 is an array antenna having a structure in which a plurality of antenna cells is arrayed in one- or two-dimensional form, the elevation angle adjustment part 222 may include a transmission angle adjustment device realized in an electronic manner. For example, the elevation angle adjustment part 222 may include an array antenna transmission control device which adjusts transmission power, timing, or the like of each antenna cell of the array antenna to adjust transmission directions of transmission radio waves of the whole antenna.

In addition, when the receiving antenna 214 is an array antenna having a structure in which a plurality of antenna cells is arrayed in one- or two-dimensional form, the elevation angle adjustment part 222 may include a reception angle adjustment device realized in an electronic manner. For example, the elevation angle adjustment part 222 may include an array antenna reception signal processing device which processes signals received by each antenna cell of the array antenna by adding weighted values to the signals of each cell so as to be suitable for a desired reception direction.

Figure 9:
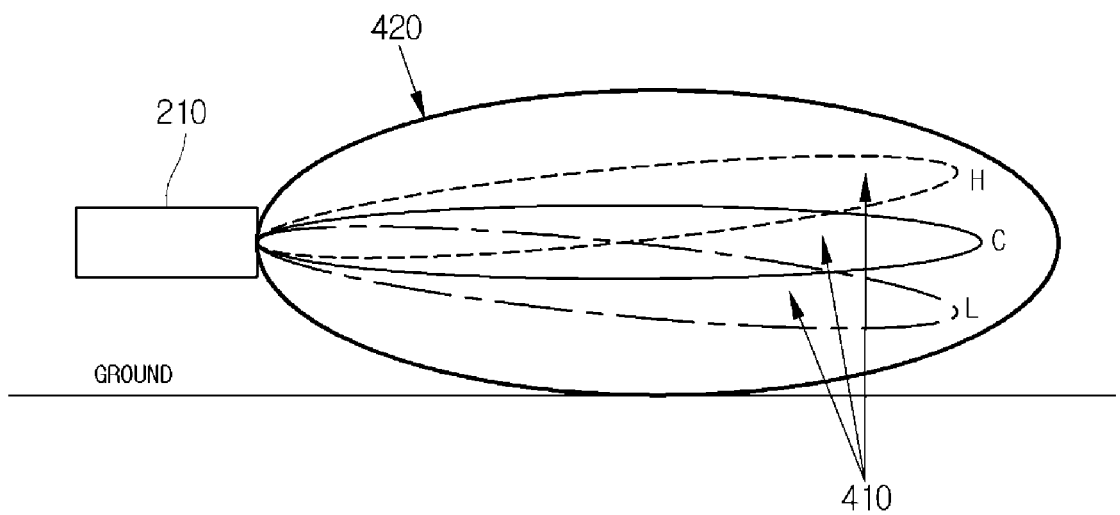
FIG. 9 is a view illustrating an example of setting a beam through a transmission (Tx) antenna according to the embodiment of the present invention.

When the control unit 220 sets a beam through the transmission antenna 212, the control unit 220 transmits radar signals of a transmission (Tx) antenna beam 410 on a monitoring cycle of the high beam H, the center beam C, and the low beam L through the transmission antenna 212, and receives reflected radar signals of a receiving (Rx) antenna beam 420 within one receiving antenna beam region through the receiving antenna 214, as shown in FIG. 9. FIG. 9 is a view illustrating an example of setting a beam through the transmission (Tx) antenna according to the embodiment of the present invention. For example, the control unit 220 may control the radar signals such that a radar signal is first transmitted as a signal corresponding to the high beam H through the transmission antenna 212, another radar signal is transmitted as a signal corresponding to the center beam C after 50 ms, and a further radar signal is transmitted as a signal corresponding to the low beam L after 50 ms. That is, the radar signals are alternately transmitted as signals corresponding to the high beam H, the center beam C, and the low beam L every regular time (50 ms).

Figure 10:
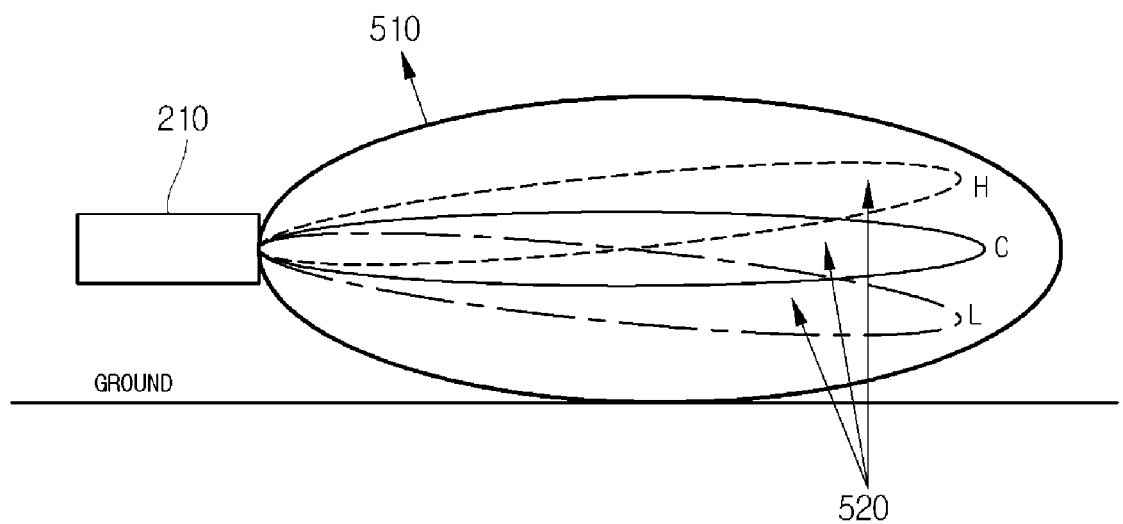
FIG. 10 is a view illustrating an example of setting a beam through a receiving (Rx) antenna according to the embodiment of the present invention.

In addition, when the control unit 220 sets a beam through the receiving (Rx) antenna 214, the control unit 220 transmits radar signals of a transmission antenna beam 510 to one transmission antenna beam region through the transmission antenna 212, and receives reflected radar signals of a receiving antenna beam 520 on a monitoring cycle of the high beam H, the center beam C, and the low beam L through the receiving antenna 214, as shown in FIG. 10. FIG. 10 is a view illustrating an example of setting a beam through the receiving (Rx) antenna according to the embodiment of the present invention. For example, the control unit 220 may control the reflected radar signals such that a reflected radar signal of the receiving antenna beam 520 is first received as a signal corresponding to the high beam H through the receiving antenna 214, another reflected radar signal is received as a signal corresponding to the center beam C after 50 ms, and a further reflected radar signal is received as a signal corresponding to the low beam L after 50 ms. That is, the reflected radar signals are alternately received as signals corresponding to the high beam H, the center beam C, and the low beam L every regular time (50 ms).

Meanwhile, the control unit 220 transmits radar signals as signals corresponding to the high beam H, the center beam C, and the low beam L according to the elevation angles, sets an elevation angle, at which received power of a reflected radar signal received through the receiving antenna 214 is the greatest, as a center angle, and sets a beam corresponding to the set center angle as a new center beam C'. The control unit 220 may add a beam directed upward by a certain angle on the basis of the set new center beam C' to set the beam as a new high beam H' or add a beam directed downward by a certain angle on the basis of the set new center beam C' to set the beam as a new low beam L'.

In this case, in the control unit 220, the signal intensity measurement part 224 measures the received power of the reflected radar signals received through the receiving antenna 214. That is, the signal intensity measurement part 224 measures and obtains the received power of the respective reflected radar signals which are transmitted from the transmission antenna 212 according to the respective elevation angles and are then reflected by the forward vehicle 120 and returned.

In addition, when the high beam H has the highest received power, the control unit 220 sets the high beam H as a new center beam C' corresponding to the center angle, sets the center beam C having the second-highest received power as a new low beam L', and adds a beam directed upward by a certain angle on the basis of the new center beam C' to set the beam as a new high beam H'.

In addition, when the low beam L has the highest received power, the control unit 220 sets the low beam L as a new center beam C' corresponding to the center angle, sets the center beam C having the second-highest received power as a new high beam H', and adds a beam directed downward by a certain angle on the basis of the new center beam C' to set the beam as a new low beam L'.

Accordingly, the control unit 220 transmits the radar signals as signals corresponding to the new high beam H', the new center beam C', and the low beam L' every regular cycle, and receives the reflected radar signals thereof.

The control unit 220 may set an interest rate of each beam based on the received power thereof. For example, an interest rate of the new center beam C' having the highest received power may be set to be "1", and an interest rate of the new high beam H' or new low beam L' having the received power which is gradually decreased to be close to a threshold value may be set to be 0.7, 0.6, or the like while being reduced by 0.1 units.

In this case, the control unit 220 may set an interest rate of a beam having received power equal to or less than the threshold value to be "0", and may remove the beam when the interest rate is "0" such that the beam is not used. For example, when the high beam H is set as a new center beam C', a beam directed upward by a certain angle on the basis of the new center beam C' is added and set as a new high beam H', the center beam C is set as a new low beam L', and the low beam L has received power equal to or less than the threshold value so that the interest rate of the low beam L is "0". Therefore, the control unit 220 removes the low beam L and does not use the same.

The control unit 220 may set a regular cycle of each beam, for example, such that the cycle is in a unit of 50 ms. However, the control unit 220 may change a cycle of a relatively smaller new high beam H' or new low beam L' than the new center beam C' having the highest received power and set the cycle to be, for example, 100 ms such that the time is longer.

The control unit 220 may recognize that the forward vehicle 120 travels on the uphill road when the high beam H has the highest received power, and may recognize that the forward vehicle 120 travels on the downhill road when the low beam L has the highest received power.

Figure 6:
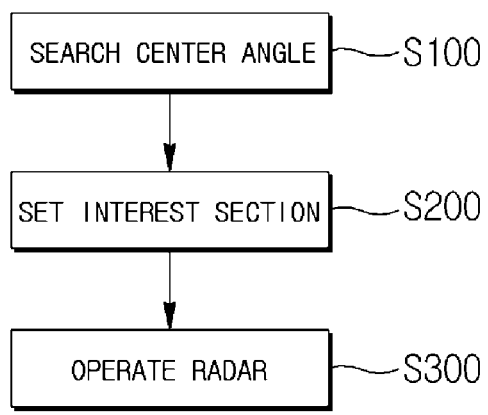
FIG. 6 is an operation flowchart for explaining the method of controlling automotive radar according to the embodiment of the present invention.

FIG. 6 is an operation flowchart for explaining the method of controlling automotive radar according to the embodiment of the present invention.

Referring to FIG. 6, the automotive radar apparatus 200 according to the embodiment of the present invention first performs a process of searching a center angle (S100).

Figure 7:
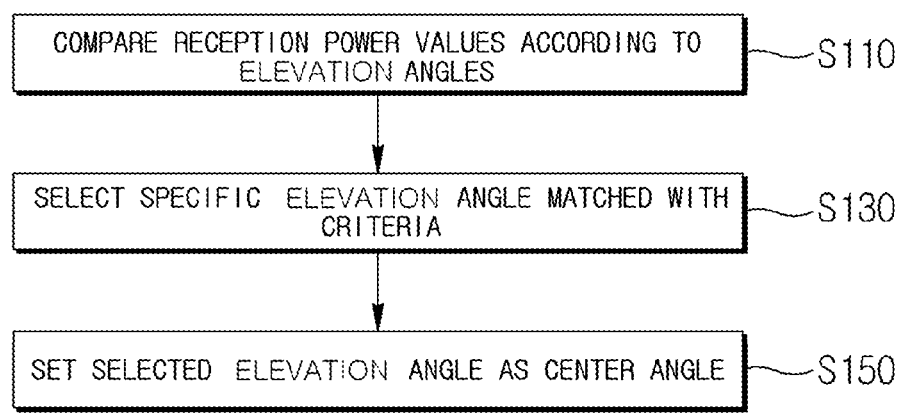
FIG. 7 is a flowchart illustrating a process of searching a center angle according to the embodiment of the present invention.

That is, the control unit 220 searches and sets the center angle based on the received power according to the elevation angle through a process shown in FIG. 7. FIG. 7 is a flowchart illustrating a process of searching the center angle according to the embodiment of the present invention. In FIG. 7, the control unit 220 compares the received power according to the elevation angles of the antenna unit 210 (S110). That is, the control unit 220 transmits radar signals according to the respective elevation angles through the transmission antenna 212 and receives reflected radar signals through the receiving antenna 214, so as to compare the received power of the respective reflected radar signals.

In this case, the control unit 220 may transmit radar signals while vertically adjusting the elevation angles of the transmission antenna 212 by a certain angle (for example, 3°) using the motor, and may receive respective reflected radar signals corresponding thereto.

In addition, the control unit 220 may transmit a radar signal for each angle while adjusting the elevation angle of the transmission antenna 212 in an electronic manner through a digital beamforming method according to beamforming logic such as a method of changing an antenna array, or may receive a reflected radar signal for each angle while adjusting the elevation angle of the receiving antenna 214.

Next, the control unit 220 compares the received power of the respective reflected radar signals, and then selects a specific elevation angle matched with a criteria (S130). That is, the control unit 220 selects an angle at which the received power of each reflected radar signal is equal to or more than a certain criteria and is the greatest, from among the elevation angles of the transmission antenna 212 or receiving antenna 214.

Next, the control unit 220 sets the selected specific elevation angle as a center angle of the antenna unit 210 (S150).

Figure 8:
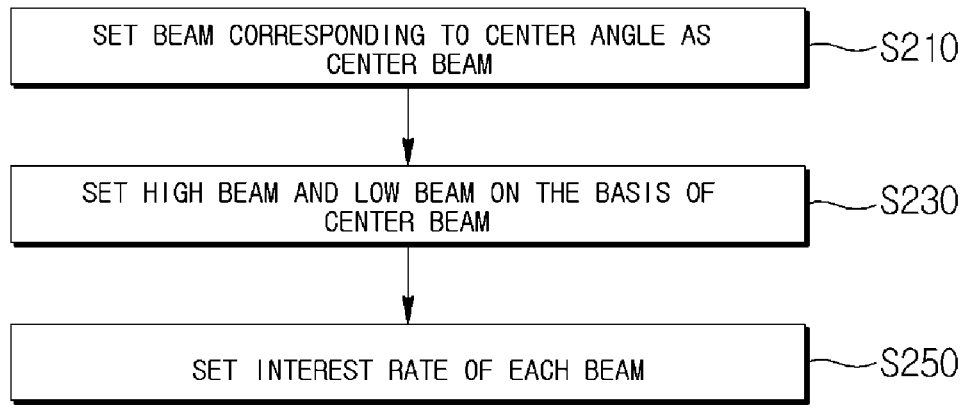
FIG. 8 is a flowchart illustrating a process of setting ranges of interest according to the embodiment of the present invention.

Meanwhile, after the center angle is searched and set through the above-mentioned process in FIG. 6, the control unit 220 sets ranges of interest through a process shown in FIG. 8 (S200). FIG. 8 is a flowchart illustrating a process of setting the ranges of interest according to the embodiment of the present invention. Referring to FIG. 8, the control unit 220 sets the beam corresponding to the center angle set through the process shown in FIG. 7 as a center beam (S210). That is, the control unit 220 sets the center beam C such that an elevation angle at which the received power is the greatest from among the elevation angles of the antenna unit 210 is the center angle.

Next, the control unit 220 sets a high beam H directed upward by a certain angle and a low beam L directed downward by a certain angle on the basis of the set center beam C (S230).

For example, when the center angle is a vertical elevation angle of 0° such that a radar signal is transmitted in a straight line from the vehicle 110 to the forward vehicle 120 and a reflected radar signal is received, as it is, in a straight line from the forward vehicle 120, the beam corresponding to the center angle is set as a center beam C, the beam directed upward by a vertical elevation angle of 3° on the basis of the center beam C is set as a high beam H, and the beam directed downward by a vertical elevation angle of −3° on the basis of the center beam C is set as a low beam L.

Next, the control unit 220 sets an interest rate of each beam H, C, or L (S250).

In this case, the control unit 220 may change a monitoring cycle of each beam based on the received power thereof. In this case, the control unit 220 may set an interest rate for each beam based on the received power thereof and then change a monitoring cycle of the beam based on the set interest rate. In addition, the control unit 220 may exclude a beam having received power, which is equal to or less than a threshold value, from the ranges of interest.

For example, when all of the vehicle 110 and the forward vehicle 120 travel on the flat road as shown in FIG. 2, the interest rate of the center beam C having the highest received power may be set to be "1", and the interest rate of the high beam H or low beam L having smaller received power than the center beam C may be set to be about 0.8 or 0.7.

In addition, when the vehicle 110 travels on the flat road and the forward vehicle 120 travels on the uphill road as shown in FIG. 3, the control unit 220 sets the high beam H as a new center beam C', sets the center beam C as a new low beam L', and adds a beam directed upward by a certain angle on the basis of the new center beam C' to set the beam as a new high beam H'. Therefore, the control unit 220 may set the interest rate of the high beam H having the highest received power, namely, the interest rate of the new center beam C' to be "1" and may set the interest rate of the new high beam H' or new low beam L' having smaller received power than the new center beam C' to be about 0.7 or 0.8. In this case, an interest rate in an upper region of the original high beam H is "0" but the interest rate in the upper region is increased to be 0.7 or 0.8 while the upper region is changed to a new high beam H'. In addition, the original low beam L has received power equal to or less than a threshold value while the original low beam L corresponding to the center angle is changed from the center beam C to the high beam H, and thus the interest rate of the original low beam L is changed to be "0". Accordingly, the control unit 220 removes the low beam L the interest rate of which becomes "0" such that the low beam L is excluded from the monitoring cycle so as not to be used.

In addition, when the vehicle 110 travels on the flat road and the forward vehicle 120 travels on the downhill road as shown in FIG. 4, the control unit 220 sets the low beam L as a new center beam C', sets the center beam C as a new high beam H', and adds a beam directed downward by a certain angle on the basis of the new center beam C' to set the beam as a new low beam L'. Therefore, the control unit 220 may set the interest rate of the low beam L having the highest received power, namely, the interest rate of the new center beam C' to be "1" and may set the interest rate of the new high beam H' or new low beam L' having smaller received power than the new center beam C' to be about 0.7 or 0.8. In this case, an interest rate in a low region of the original low beam L is "0" but the interest rate in the low region is increased to be 0.7 or 0.8 while the low region is changed to a new low beam L'. In addition, the original high beam H has received power equal to or less than a threshold value while the original high beam H corresponding to the center angle is changed from the center beam C to the low beam L, and thus the interest rate of the original high beam H is changed to be "0". Accordingly, the control unit 220 removes the high beam H the interest rate of which becomes "0" such that the high beam H is excluded from the monitoring cycle so as not to be used.

Meanwhile, when the control unit 220 performs beam-forming on a cycle of the high beam H, the center beam C, and the low beam L during traveling of the vehicle 110 on the flat road, a cycle time of the center beam C may be set to be 30 ms which is shorter than a certain criteria (for example, 50 ms) when the center beam C having the highest interest rate is beam-formed and a cycle time of the high beam H or low beam L may be set to be 80 ms or 100 ms which is longer than a certain criteria (for example, 50 ms) when the high beam H or the low beam L having a decreased interest rate is beam-formed.

In addition, when the control unit 220 performs beam-forming on a cycle of the new high beam H', the new center beam C', and the new low beam L' during traveling of the vehicle 110 on the uphill or downhill road, a cycle time of the new center beam C' may be set to be 20 ms which is shorter than a certain criteria (for example, 50 ms) when the new center beam C' having the highest interest rate is beam-formed and a cycle time of the new high beam H' or new low beam L' may be set to be 70 ms or 80 ms which is longer than a certain criteria (for example, 50 ms) when the high beam H or the low beam L having a decreased interest rate is beam-formed.

The control unit 220 may recognize that the forward vehicle 120 travels on the uphill road as shown in FIG. 3 when the high beam H has the highest received power, and may recognize that the forward vehicle 120 travels on the downhill road as shown in FIG. 4 when the low beam L has the highest received power.

When the high beam H or the low beam L is set as a new center beam C', the control unit 220 removes the existing low beam L or high beam H having received power which is lowest or is equal to or less than a threshold value.

In addition, the control unit 220 may allocate a radio wave transmission/receiving time of the center beam C, a radio wave transmission/receiving time of the high beam H, and a radio wave transmission/receiving time of the low beam L according to a time allocation ratio set by a specific table.

First, when it is determined that the high beam H has received power which is the highest and exceeds a threshold value, for example, the time allocation of the center beam C may be set to be 50% while the elevation angle thereof is set as an angle of 3°, the time allocation of the high beam H may be set to be 25% while the angle thereof is set as an angle of 6°, and the time allocation of the low beam L may be set to be 25% while the angle thereof is set as an angle of 0°.

In addition, when it is determined that the high beam H has received power which is the highest and does not exceed a threshold value, for example, the time allocation of the center beam C may be set to be 40% while the elevation angle thereof is set as an angle of 0°, the time allocation of the high beam H may be set to be 40% while the angle thereof is set as an angle of 3°, and the time allocation of the low beam L may be set to be 20% while the angle thereof is set as an angle of −3°.

On the other hand, when it is determined that the low beam L has received power which is the highest and exceeds a threshold value, for example, the time allocation of the center beam C may be set to be 50% while the elevation angle thereof is set as an angle of −3°, the time allocation of the high beam H may be set to be 25% while the angle thereof is set as an angle of 0°, and the time allocation of the low beam L may be set to be 25% while the angle thereof is set as an angle of −6°.

In addition, when it is determined that the low beam L has received power which is the highest and does not exceed a threshold value, for example, the time allocation of the center beam C may be set to be 40% while the elevation angle thereof is set as an angle of 0°, the time allocation of the high beam H may be set to be 20% while the angle thereof is set as an angle of 3°, and the time allocation of the low beam L may be set to be 40% while the angle thereof is set as an angle of −3°. Here, the above angles and time allocation percentages are exemplified, and various angles and time allocation percentages may be applied in a similar regulation.

As described above, the set specific tables may be stored in an inner storage part (not shown) of the automotive radar apparatus 200 to be managed.

Meanwhile, when the ranges of interest are set as a new high beam H', a new center beam C', and a new low beam L', the control unit 220 performs a radar operation for transmitting radar signals or receiving reflected radar signals through the ranges of interest (S300).

In this case, the control unit 200 transmits the radar signals or receives the reflected radar signals through the new high beam H', the new center beam C', and the new low beam L' while adjusting the cycles of the beams according to the interest rates based on the received power.

In accordance with the method of controlling automotive radar as described in the above embodiment, it may be seen that the automotive radar effectively detects the preceding vehicle even though the road slopes, as shown in FIGS. 2 to 4.

In accordance with the present invention as described above, it may be possible to realize the automotive radar apparatus and the method of controlling automotive radar, capable of recognizing the road gradient by easily adjusting the vertical scan angle based on intensities of radio waves received by the radar of the vehicle traveling on the road to recognize the gradient of the road, and of preventing deterioration of detection performance by vertically adjusting the radio wave elevation angle of the radar so as to be suitable for the road gradient.

As is apparent from the above description, the present invention has an advantage capable of adjusting a scan angle of radar in real time during traveling of a vehicle.

In addition, the present invention has an advantage capable of preventing deterioration of detection performance by easily adjusting a vertical scan angle of the radar of the traveling vehicle according to a road gradient.

In addition, the present invention has an advantage capable of preventing a phenomenon in which a target is not detected due to low power of signals received by the radar when the road on which the vehicle travels is changed from a flat road to an uphill or downhill road.

Furthermore, the present invention has an advantage capable of preventing a vehicle collision accident or the like by automatically adjusting a vertical elevation angle of the radar even though the road slopes and consistently detecting a preceding vehicle.

While the present invention has been described with respect to the specific embodiments, it will be apparent to those skilled in the art that various changes and modifications may be made without departing from the spirit and scope of the invention as defined in the following claims.

What is claimed is:

1. An automotive radar apparatus comprising:
    an antenna unit having a transmission antenna and a receiving antenna, and configured to adjust elevation angle of the transmission antenna,
        transmit radar beams through the transmission antenna in elevation angles of the transmission antenna, and
        receive, through the receiving antenna, reflected radar beams transmitted in the elevation angles of the transmission antenna; and
    a control unit configured to
        determine a reflected radar beam having a power matched with a preset criteria, among the received reflected radar beams,
        select an elevation angle of transmitted radar beam corresponding to the determined reflected radar beam as a center angle of the elevation angles of the transmission antenna, and
        set a center radar beam corresponding to the center angle among the elevation angles of the transmission antenna, and
        set ranges of interest of a high radar beam and a low radar beam on the basis of the set center radar beam,
    wherein
        the control unit comprises a signal intensity measurement part configured to measure powers of the received reflected radar beams,
    wherein the control unit is configured to
        set the high radar beam directed upward by a first certain angle and the low radar beam directed downward by a second certain angle on the basis of the set center radar beam, and
    wherein, when the high beam has the highest received power, the control unit is configured to
        set the high radar beam as a new center radar beam corresponding to the center angle among the elevation angles of the transmission antenna,
        set the set center radar beam as a new low radar beam, and
        set a new high radar beam directed upward by a certain angle on the basis of the new center radar beam.

2. The automotive radar apparatus according to claim 1, wherein the control unit further comprises an elevation angle adjustment part configured to drive a motor and adjust the elevation angle of the transmission antenna or elevation angle of receiving antenna, so as to transmit a radar signal or receive a reflected radar signal in the adjusted elevation angle.

3. The automotive radar apparatus according to claim 1, wherein the control unit further comprises an elevation angle adjustment part configured to adjust elevation angle of the transmission antenna or elevation angle of the receiving antenna in a digital beamforming logic so as to transmit a radar beam or receive a reflected radar beam in the adjusted elevation angle.

4. The automotive radar apparatus according to claim 1, wherein the power of the determined reflected radar beam is equal to or more than the preset criteria and is the greatest.

5. The automotive radar apparatus according to claim 1, wherein the control unit is configured to
    set the radar beams to be transmitted, through the transmission antenna, on a cycle of the high radar beam, the center radar beam, and the low radar beam by adjusting the elevation angle of the transmission antenna, and
    receive the reflected radar beams within one receiving antenna beam region.

6. The automotive radar apparatus according to claim 1, wherein the control unit is configured to
    set the radar beams to be transmitted corresponding to one transmission antenna beam region and
    receive, through the receiving antenna, the reflected radar beams on a cycle of the high radar beam, the center radar beam, and the low radar beam.

7. The automotive radar apparatus according to claim 1, wherein:
    when the low beam has the highest received power, the control unit is configured to
        set the low radar beam as a new center radar beam corresponding to the center angle among the elevation angles of the transmission antenna,
        set the center radar beam as a new high beam, and
        set a new low radar beam directed downward by a certain angle on the basis of the new center radar beam.

8. The automotive radar apparatus according to claim 1, wherein:
the control unit is configured to change a monitoring cycle of each beam of the high radar beam, center radar beam, and low radar beam based on the received power thereof.

9. The automotive radar apparatus according to claim 8, wherein:
the control unit is configured to set an interest rate for the each beam based on the power of the received reflected radar beams thereof, and
the control unit is configured to change the monitoring cycle based on the set interest rate and excludes a beam having a power less than a threshold value from the ranges of interest.

10. The automotive radar apparatus according to claim 9, wherein the control unit is configured to
set a monitoring period of a beam having the highest interest rate to be smaller than a certain criteria and
set a monitoring period of the beam having a decreased interest rate to be longer than the certain criteria.

11. A method of controlling automotive radar, the method performed by an automotive radar apparatus comprising an antenna unit having a transmission antenna and a receiving antenna, and a control unit, the method comprising:
transmitting radar beams through the transmission antenna in elevation angles of the transmission antenna;
receiving, through the receiving antenna, reflected radar beams transmitted in the elevation angles of the transmission antenna;
determining a reflected radar beam having a power matched with a preset criteria, among the received reflected radar beams;
selecting an elevation angle of transmitted radar beam corresponding to the determined reflected radar beam as a center angle of the elevation angles of the transmission antenna;
setting a center radar beam corresponding to the center angle among the elevation angles of the transmission antenna;
setting ranges of interest of a high radar beam and a low radar beam on the basis of the set center radar beam; and
transmitting, through the transmission antenna, the radar beams to the set ranges of interest or receiving, through the receiving antenna, the reflected radar beams from the set ranges of interest,
wherein the setting the ranges of interest comprises
setting the high radar beam directed upward by a first certain angle and the low radar beam directed downward by a second certain angle on the basis of the center radar beam, and
wherein, when the high beam has the highest received power, the control unit:
sets the high radar beam as a new center radar beam corresponding to the center angle among the elevation angles of the transmission antenna;
sets the center radar beam as a new low radar beam; and
sets a new high radar beam directed upward by the certain angle on the basis of the new center radar beam.

* * * * *